US008275130B2

(12) United States Patent
Kawamura et al.

(10) Patent No.: US 8,275,130 B2
(45) Date of Patent: Sep. 25, 2012

(54) SYSTEM AND METHOD FOR REGISTERING SECRET KEY

(75) Inventors: Daisuke Kawamura, Aichi (JP); Hiroaki Iwashita, Aichi (JP); Kouhei Kishimoto, Aichi (JP); Yuuki Nawa, Aichi (JP); Yoshiyuki Mizuno, Aichi (JP); Hiromitsu Mizuno, Aichi (JP); Shinichi Koga, Aichi (JP); Kota Nishida, Aichi (JP); Tomohiro Ito, Aichi (JP); Hideki Kawai, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 408 days.

(21) Appl. No.: 12/613,149

(22) Filed: Nov. 5, 2009

(65) Prior Publication Data

US 2010/0220857 A1 Sep. 2, 2010

(30) Foreign Application Priority Data

Mar. 2, 2009 (JP) ................................ 2009-048081

(51) Int. Cl.
*H04L 9/00* (2006.01)

(52) U.S. Cl. ........................................................ 380/44

(58) Field of Classification Search ........................ None
See application file for complete search history.

(56) References Cited

U.S. PATENT DOCUMENTS 7,979,716 B2 * 7/2011 Fiske ............................ 713/184

FOREIGN PATENT DOCUMENTS

JP 2004-300803 A 10/2004

* cited by examiner

*Primary Examiner* — Brandon Hoffman
(74) *Attorney, Agent, or Firm* — Patterson Thuente Christensen Pedersen, P.A.

(57) ABSTRACT

A secret key registration system which registers a secret key in a portable key device and vehicle. A first transformation equation is stored in a writer and the vehicle. A second transformation equation is stored in the portable key device and the vehicle. The writer transmits a registration code to the portable key device and generates intermediate data with the first transformation equation of the writer. The intermediate data is transmitted to the portable key device, which generates the secret key from the intermediate data with the second transformation equation. The portable key device transmits the registration code to the vehicle. The vehicle generates intermediate data from the registration code with the first transformation equation of the vehicle, and then generates the secret key from the intermediate data with the second transformation equation.

11 Claims, 5 Drawing Sheets

Electronic Key Manufacturing

SYSTEM AND METHOD FOR REGISTERING SECRET KEY

CROSS-REFERENCE TO RELATED APPLICATIONS

This application is based upon and claims the benefit of priority from prior Japanese Patent Application No. 2009-048081, filed on Mar. 2, 2009, the entire contents of which are incorporated herein by reference.

BACKGROUND OF THE INVENTION

The present invention relates to a system and method for registering in a remote communication terminal and a communication peer an encryption key, or secret key, which is used for cryptographic communication performed between the remote communication terminal and communication peer.

In the prior art, an electronic key system for a vehicle includes a portable key device, which transmits a unique key code through wireless communication. The vehicle key system is a wireless door lock system and/or key operation-free system. In a wireless door lock system, an in-vehicle device locks and unlocks the vehicle doors when a button on a remote portable key device is operated. In a key operation-free system, when receiving a request signal from a vehicle, a portable key device returns an ID code to the vehicle. When the returned ID code is authenticated, an in-vehicle device locks or unlocks the doors. The in-vehicle device may also permit starting of the engine or actually start the engine.

For the ID code transmitted from the portable key device to be secure against eavesdropping or tampering, the vehicle electronic key system performs cryptographic communication. Japanese Laid-Open Patent Publication No. 2004-300803 describes an electronic key system that uses a secret key code (shared key code) technique. In the secret key code technique, an encryption key held by a sender is the same, or shared, by a decryption key held by a recipient. This secret key technique, in which the sender and the recipient uses the same key, is advantageous in that the encryption and decryption processing speeds are high and is thereby widely used in cryptographic communication for vehicles.

SUMMARY OF THE INVENTION

In a vehicle key system that performs cryptographic communication, the vehicle and portable key device must both hold the secret key. Thus, the secret key must be registered in both the portable key device and the vehicle. If the secret key is eavesdropped on when the portable key device or vehicle is manufactured, ID authentication may be wrongfully performed after the vehicle is shipped from the factory.

The present invention provides a system and method for registering a secret key that is secure against eavesdroppers.

One aspect of the present invention is a secret key registration system which registers a secret key in each of a remote communication terminal and a communication peer, which performs wireless communication with the remote communication terminal. The secret key registration system includes a first transformation equation and a second transformation equation for generating the secret key. A registration code that is varied whenever registered is transformed with the first transformation equation to generate intermediate data. The generated intermediate data is transformed with the second transformation equation to generate the secret key. The first transformation equation is stored in each of a writer, which writes the registration code to the remote communication terminal, and the communication peer. The second transformation equation is stored in each of the remote communication terminal and the communication peer. A first registration processor is arranged in the remote communication terminal and the writer to register the secret key in the remote communication terminal. A second registration processor is arranged in the remote communication terminal and the communication peer to register the secret key in the communication peer. The first registration processor is configured to transmit the registration code from the writer to the remote communication terminal, apply the registration code to the first transformation equation stored in the writer to generate the intermediate data, transmit the intermediate data to the remote communication terminal, apply the intermediate data to the second transformation equation stored in the remote communication terminal to generate the secret key, and register the generated secret key in the remote communication terminal. The second registration processor is configured to transmit the registration code stored in the remote communication terminal to the communication peer through wireless communication, apply the registration code received from the remote communication terminal to the first transformation equation stored in the communication peer to generate the intermediate data, apply the generated intermediate data to the second transformation equation stored in the communication peer to generate the secret key, and register the generated secret key in the communication peer.

A further aspect of the present invention is a method for registering a secret key in each of a remote communication terminal and a communication peer, which performs wireless communication with the remote communication terminal. The method includes preparing a first transformation equation and a second transformation equation for generating the secret key. A registration code that is varied whenever registered is transformed with the first transformation equation to generate intermediate data. The generated intermediate data is transformed with the second transformation equation to generate the secret key. The first transformation equation is stored in each of a writer, which writes the registration code to the remote communication terminal, and the communication peer. The second transformation equation is stored in each of the remote communication terminal and the communication peer. The method further includes registering the secret key in the remote communication terminal, and registering the secret key in the communication peer. The registration of the secret key in the remote communication terminal includes transmitting the registration code from the writer to the remote communication terminal, applying the registration code to the first transformation equation stored in the writer to generate the intermediate data, transmitting the intermediate data to the remote communication terminal, applying the intermediate data to the second transformation equation stored in the remote communication terminal to generate the secret key, and registering the generated secret key in the remote communication terminal. The registration of the secret key in the communication peer includes transmitting the registration code stored in the remote communication terminal to the communication peer through wireless communication, applying the registration code received from the remote communication terminal to the first transformation equation stored in the communication peer to generate the intermediate data, applying the generated intermediate data to the second transformation equation stored in the communication peer to generate the secret key, and registering the generated secret key in the communication peer.

According to the above-mentioned aspects of the present invention, a task for generating the secret key 16 from the registration code is carried out by cooperation of the writer and the remote communication terminal. This increases the parameters required to generate the secret key. These parameters must all be obtained to generate the secret key. This makes it difficult to wrongfully obtain the secret key and improves the security of the vehicle.

In one embodiment, the first registration processor deletes the intermediate data from the remote communication terminal after generating the secret key. This makes it difficult to obtain the intermediate data from the remote communication terminal, prevents the secret key from being wrongfully obtained, and thereby improves the security of the vehicle.

In one embodiment, the first transformation equation involves a larger computation volume than the second transformation equation. This allows for reduction in the size of the transformation equation held by the remote communication terminal, and the memory of the remote communication terminal does not need a large capacity.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A system and method for registering a secret key according to a preferred embodiment of the present invention will now be discussed.

Figure 1:
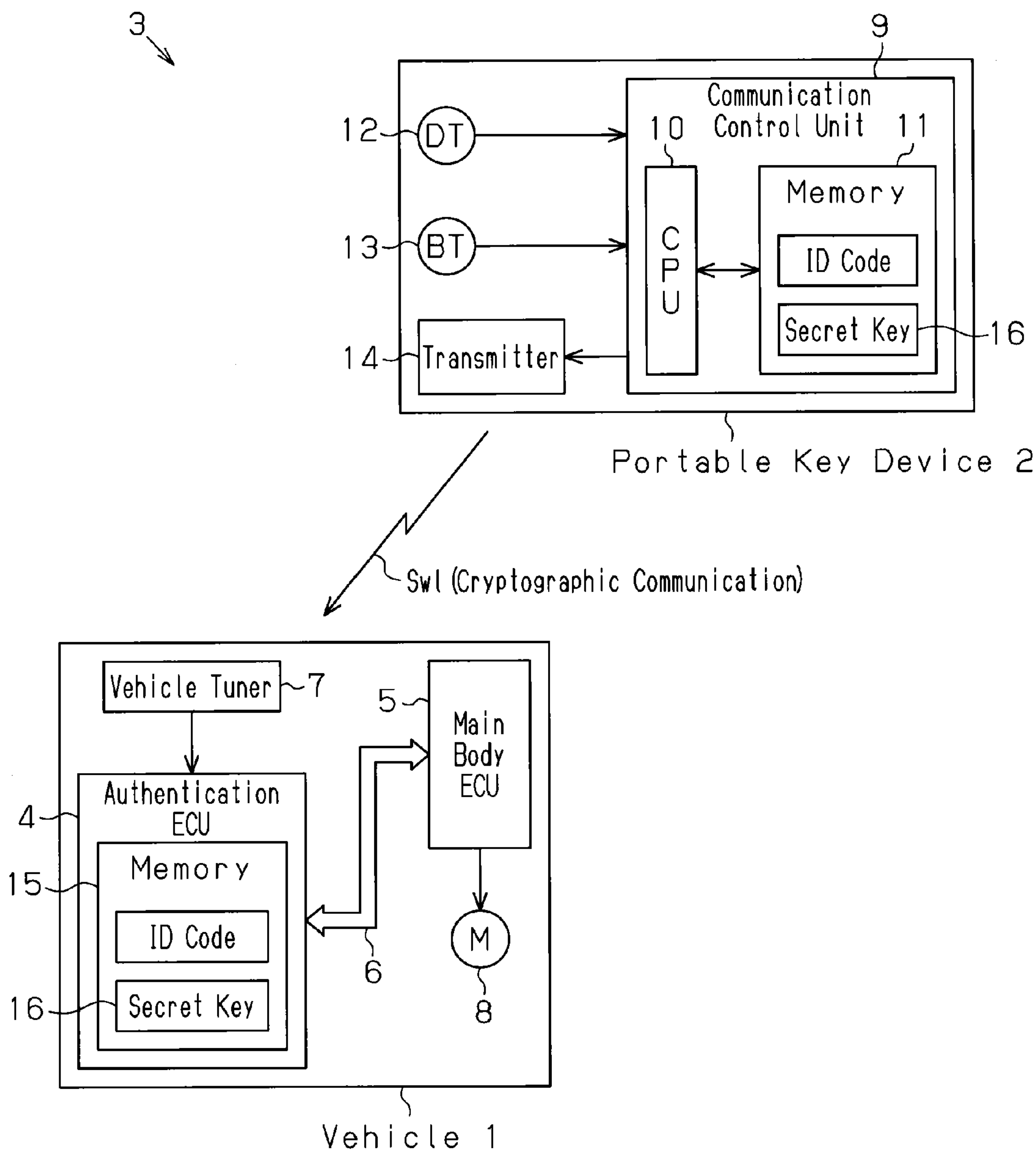
FIG. 1 is a block diagram showing a preferred embodiment of an electronic key system according to the present invention.

An electronic key system 3 will now be discussed with reference to FIG. 1. The electronic key system 3 conducts key authentication through wireless communication performed between a vehicle 1 and a portable key device 2 (so-called electronic key device or wireless key device). When the key authentication is successful, the electronic key system 3 locks or unlocks the doors. The electronic key system 3 may also start or permit the starting of the engine. An example of the wireless communication is narrow area communication. The portable key device 2 transmits the ID code to the vehicle 1 through wireless communication. The vehicle 1 performs ID authentication to authenticate the received ID code and determines whether or not the ID code is authentic. The portable key device 2 is one example of a remote communication terminal. The vehicle 1 is one example of a communication peer.

The electronic key system 3 is, for example, a wireless door lock system. In the wireless door lock system, a button on the portable key device 2 is operated to remotely control the locking or unlocking of the vehicle doors. The wireless door lock system includes an authentication ECU 4 and a main body ECU 5, which are installed in the vehicle 1. The authentication ECU 4 performs ID authentication (wireless communication authentication) with the portable key device 2. The main body ECU 5 controls the electric power supply system of the vehicle 1. A bus 6, or in-vehicle network, connects the ECUs 4 and 5 to each other. The authentication ECU 4 is connected to a vehicle tuner 7, which receives signals in the ultra-high frequency (UHF) band (approximately 312 MHz). The main body ECU 5 is connected to a door lock motor 8, which functions as a drive source for locking and unlocking the doors.

The portable key device 2 includes a communication control unit 9, which controls the operation of the portable key device 2. The communication control unit 9 includes a CPU 10 and a memory 11. The memory 11 stores a key code, or ID code, unique to the portable key device 2. The portable key device 2 further includes a lock button 12, which is operated to lock the vehicle doors from a remote location, and an unlock button 13, which is operated to unlock the vehicle doors from a remote location. Operation signals of the buttons 12 and 13 are provided to the communication control unit 9. The communication control unit 9 is connected to a transmitter 14, which transmits a wireless signal in the UHF band, and controls the signal transmission of the transmitter 14.

For instance, when the lock button 12 is operated, the communication control unit 9 transmits a wireless signal Swl (e.g., wireless signal in the UHF band) including the ID code of the portable key device 2 and a functional code (lock request code), which requests the vehicle 1 to start locking the doors, to execute narrow area communication. When the vehicle tuner 7 receives the wireless signal Swl, the authentication ECU 4 authenticates the ID code included in the wireless signal Swl with an ID code registered in its memory 15. When the ID code authentication is successful, the authentication ECU 4 instructs the main body ECU 5 to lock the doors in accordance with the lock request code.

The wireless signal Swl transmitted to the vehicle 1 from the portable key device 2 is encrypted. The illustrated example employs a secret key code technique, in which a sender and recipient of a signal both use a shared secret key. In other words, the same secret key 16 is registered in the memory 11 of the portable key device 2 and the memory 15 of the vehicle 1 (authentication ECU 4). The wireless signal Swl transmitted from the portable key device 2 is encrypted by the secret key 16. The vehicle 1 decrypts the encrypted wireless signal Swl with its secret key 16.

The registration of the secret key 16 to the vehicle 1 and the portable key device 2 will now be discussed.

Figure 2:
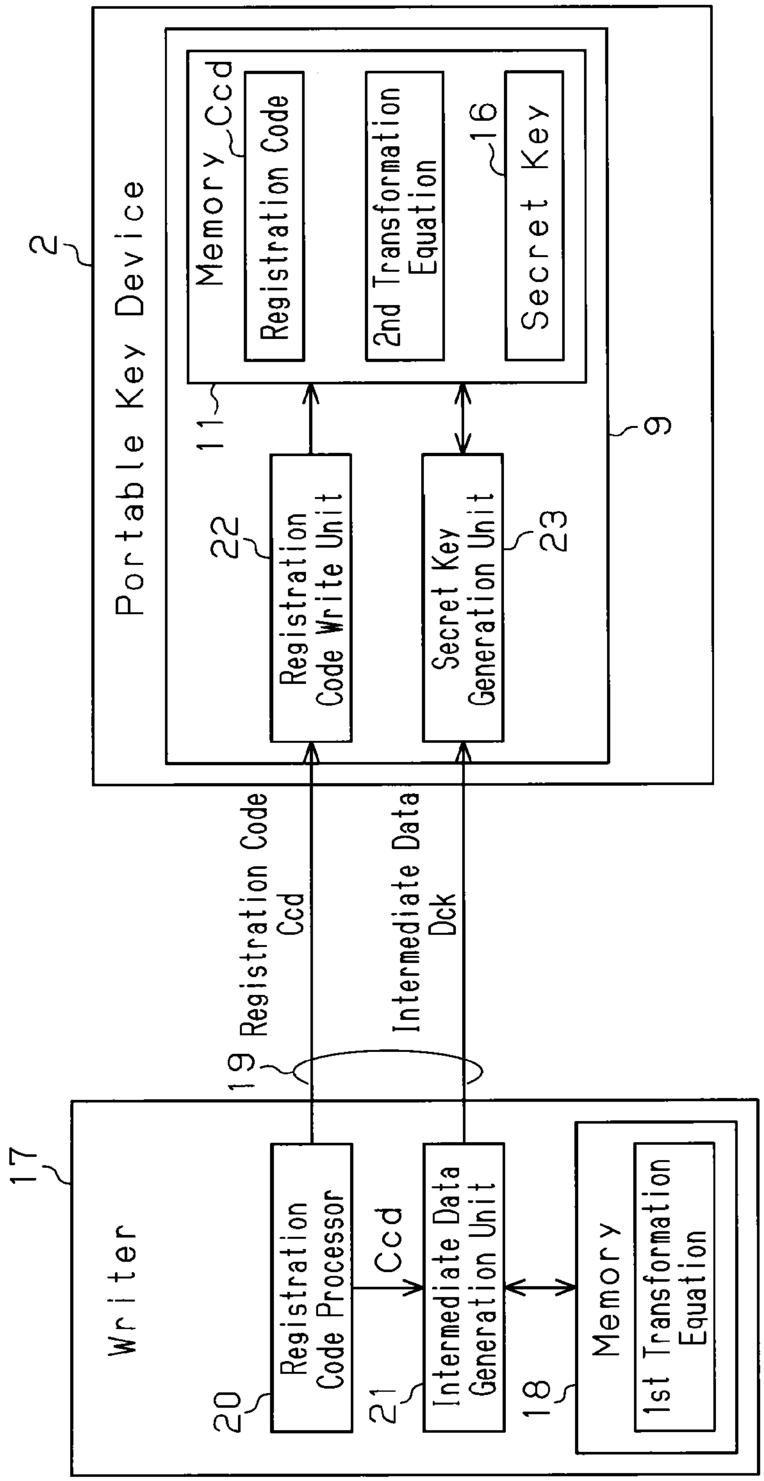
FIG. 2 is a block diagram of a secret key registration system which registers a secret key in a portable key device.

An operator first registers the secret key 16 in the portable key device 2. The registration may be performed when the portable key device 2 is manufactured by using a writer 17, which is shown in FIG. 2. The writer 17 may be arranged in a manufacturing line. The writer 17 includes a CPU (not shown), which controls the operation of each part of the writer 17, and a memory 18, which holds various data. The writer 17 directly provides various data via an electric cable 19 to an integrated circuit (IC) of the communication control unit 9 in the portable key device 2, which is conveyed along the manufacturing line. The memory 15 may be referred to as a writer memory.

A first transformation equation F1(x), which is a function required for generation of the secret key 16, is registered in the memory 18 of the writer 17. Computation according to the first transformation equation F1(x) cannot solely generate the secret key 16. The first transformation equation F1(x) is used in cooperation with another transformation equation (e.g., second transformation equation F2(x), which will be described later) to generate the secret key 16.

The writer 17 includes a registration code processor 20 and an intermediate data generation unit 21. The registration code processor 20 generates and manages a registration code Ccd. The intermediate data generation unit 21 generates intermediate data Dck, which is key information in a state one stage before becoming the secret key 16. The registration code Ccd is a code string associated with the manufactured portable key device 2. The registration code processor 20 generates the registration code Ccd with a value that is varied whenever manufacturing a portable key device (whenever registering the registration code Ccd in a portable key device). The registration code processor 20 provides the portable key device 2 and the intermediate data generation unit 21 with the generated registration code Ccd. The intermediate data generation unit 21 applies the registration code Ccd, which is received from the registration code processor 20, to the first transformation equation F1(x) to generate the intermediate data Dck. Then, the intermediate data generation unit 21 provides the intermediate data Dck to the portable key device 2. In the illustrated example, the registration code processor 20 and the intermediate data generation unit 21 are included in a first registration processor.

A second transformation equation F2(x), which is a function required for generation of the secret key 16, is registered in the memory 11 of the portable key device 2. Like the first transformation equation F1(x), computation according to the second transformation equation F2(x) cannot solely generate the secret key 16. The second transformation equation F2(x) is used in cooperation with the first transformation equation F1(x) to generate the secret key 16. The calculation amount ratio of the first transformation equation F1(x) and the second transformation equation F2(x) may be set so that the calculation amount for generating the intermediate data Dck from the registration code Ccd is greater than the calculation amount for generating the secret key 16 from the intermediate data Dck. Each of the first transformation equation F1(x) and the second transformation equation F2(x) is an algorithm of which the type is not limited.

The portable key device 2 includes a registration code write unit 22, which writes the registration code Ccd received from the writer 17 to the memory 11. The portable key device 2 further includes a secret key generation unit 23, which applies the intermediate data Dck received from the writer 17 to the second transformation equation F2(x) to generate the secret key 16. Then, the secret key generation unit 23 registers the generated secret key 16 in the memory 11 of the portable key device 2. In the memory 11, the secret key 16 functions as an encryption key for the portable key device 2. In the illustrated example, the registration code write unit 22 and the secret key generation unit 23 are included in the first registration processor. The secret key generation unit 23 may be referred to as an electronic key device secret key generation unit. The memory 11 may be referred to as an electronic key device memory.

Figure 3:
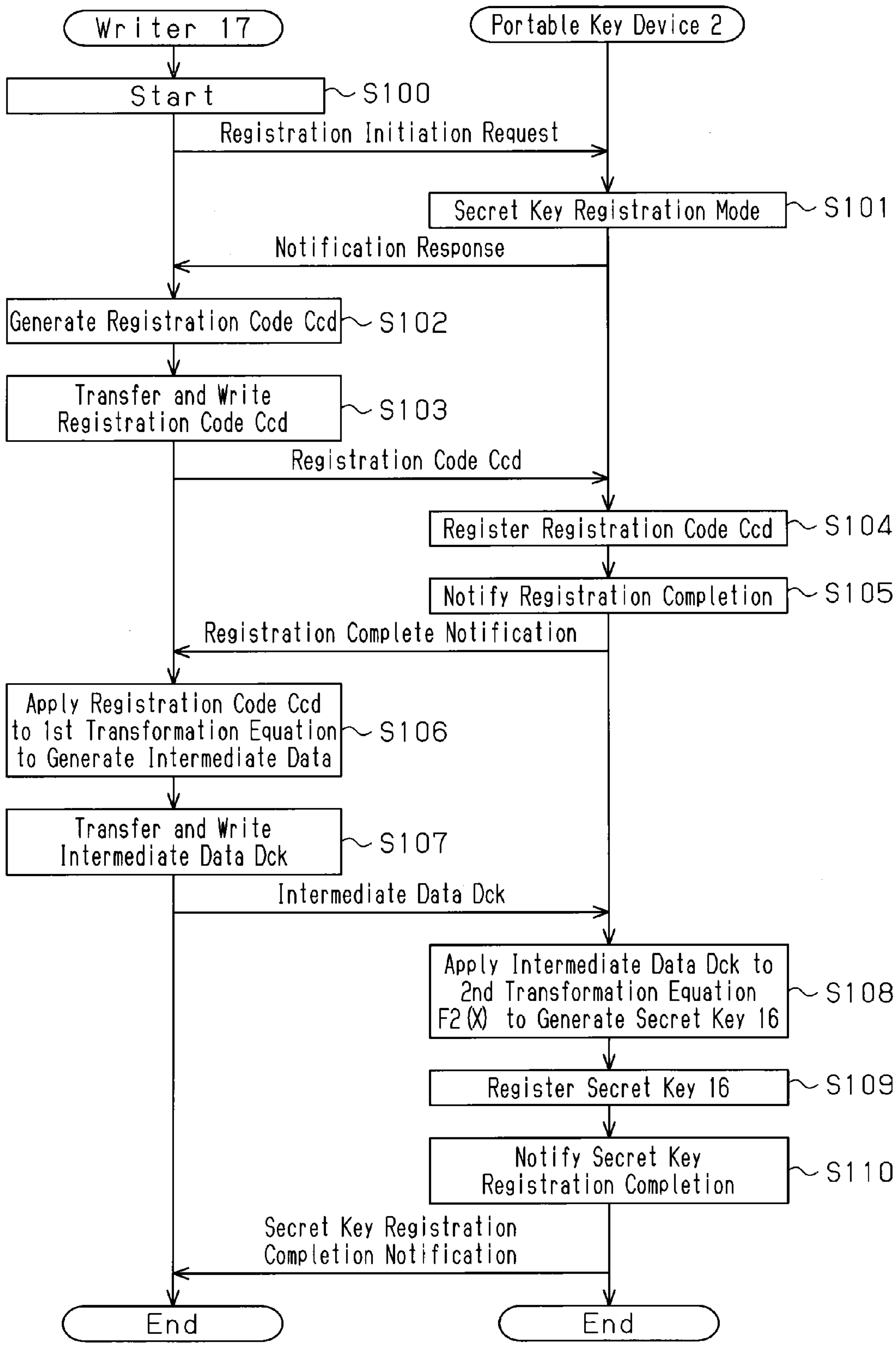
FIG. 3 is a flowchart showing a process for registering the secret key in a portable key device.

FIG. 3 is a flowchart showing a process for registering the secret key 16 in the portable key device 2. Prior to the execution of the process shown in FIG. 3, the first transformation equation F1(x) is stored in the memory 18 of the writer 17, and the second transformation equation F2(x) is stored in the memory 11 of the portable key device 2. First, an operator operates a registration initiation switch on the writer 17 to request initiation of registration of the secret key in the memory 11 of the portable key device 2 (S100). The writer 17 provides the registration initiation request to the portable key device 2. In response to the request, the portable key device 2 enters a secret key registration mode (S101) and returns to the writer 17 a notification response notifying that the secret key registration mode has been entered.

Upon receipt of the notification response from the portable key device 2, the registration code processor 20 generates the registration code Ccd (S102) and transmits the generated registration code Ccd to the portable key device 2 (S103). In the illustrated example, the registration code processor 20 transmits the generated registration code Ccd to the portable key device 2 and the intermediate data generation unit 21.

The registration code write unit 22 receives the registration code Ccd from the writer 17 and writes the received registration code Ccd to the memory 11 of the portable key device 2 (S104). When the registration code Ccd is registered (held) in the portable key device 2, the registration code write unit 22 provides a registration completion notification to the writer 17.

Upon receipt of the registration completion notification from the portable key device 2, the intermediate data generation unit 21 applies the registration code Ccd to the first transformation equation F1(x) to generate the intermediate data Dck (S106). The intermediate data generation unit 21 transmits the intermediate data Dck to the portable key device 2 (S107).

The secret key generation unit 23 receives the intermediate data Dck from the writer 17 and applies the received intermediate data Dck to the second transformation equation F2(x) to generate the secret key 16 (S108). Then, the secret key generation unit 23 writes the generated secret key 16 to the memory 11 of the portable key device 2 (S109). In this manner, the secret key 16 (encryption key of the portable key device 2) is registered in the memory 11 of the portable key device 2. When confirming registration of the secret key 16, the secret key generation unit 23 deletes the intermediate data Dck from the memory 11 of the electronic key device 2.

Upon confirmation of registration of the secret key 16, the secret key generation unit 23 transmits a secret key registration completion notification to the writer 17 (S110). This ends the process of FIG. 3. Every time a portable key device 2 is conveyed along the manufacturing line to the writer 17, the process of FIG. 3 is executed to manufacture the portable key device 2.

In one example, the first transformation equation F1(x) is used to generate the intermediate data Dck from the registration code Ccd, and the second transformation equation F2(x) is used to generate the secret key 16 from the intermediate data Dck. In one embodiment, the writer 17 does not hold the second transformation equation F2(x), and the portable key device 2 does not hold the first transformation equation F1(x). Accordingly, the writer 17 is not able to generate the secret key 16 from the registration code Ccd without the portable key device 2, and the portable key device 2 is not able to generate the secret key 16 from the registration code Ccd without the writer 17.

Figure 4:
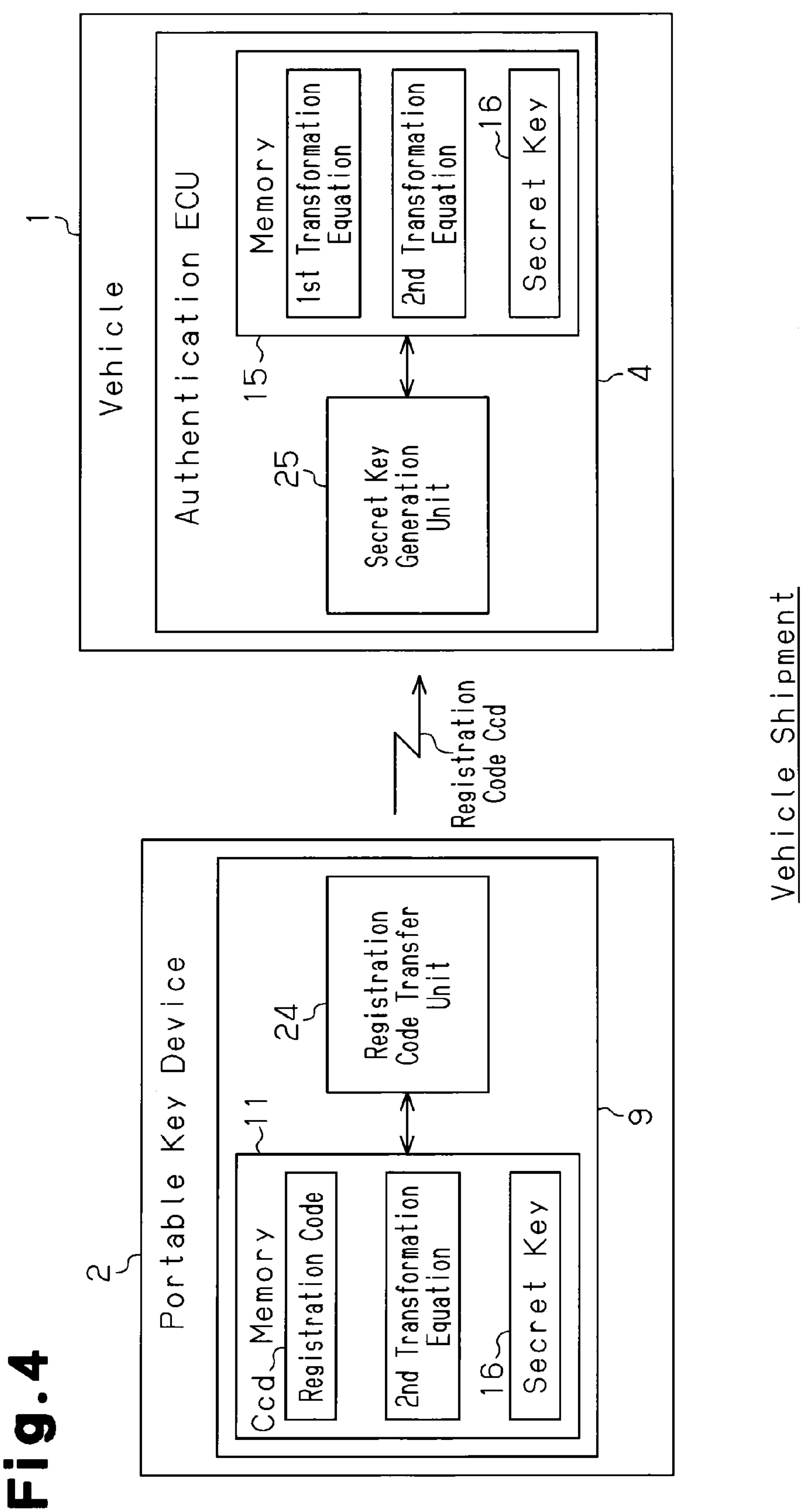
FIG. 4 is a block diagram of a secret key registration system which registers the secret key in a vehicle.

A process for registering the secret key 16 to the vehicle 1 will now be discussed with reference to FIG. 4. This process is executed in a state in which the secret key 16 has already been registered in the memory 11 of the portable key device 2. The portable key device 2 includes a registration code transfer unit 24, which outputs the registration code Ccd held in the memory 11, from the transmitter 14 (refer to FIG. 1) through wireless communication. The first transformation equation F1(x), which is the same as that registered in the writer 17, and the second transformation equation F2(x), which is the same as that registered in the portable key device 2, are registered in the memory 15 of the authentication ECU 4. The authentication ECU 4 includes a secret key generation unit 25, which generates the secret key 16 using the registration code Ccd obtained from the portable key device 2 and the first and second transformation equations F1(x) and F2(x) registered in the memory 15. In the illustrated example, the registration code transfer unit 24 and the secret key generation unit 25 are included in a second registration processor. The secret key generation unit 25 may be referred to as a vehicle secret key generation unit. The memory 15 may be referred to as a vehicle memory.

Figure 5:
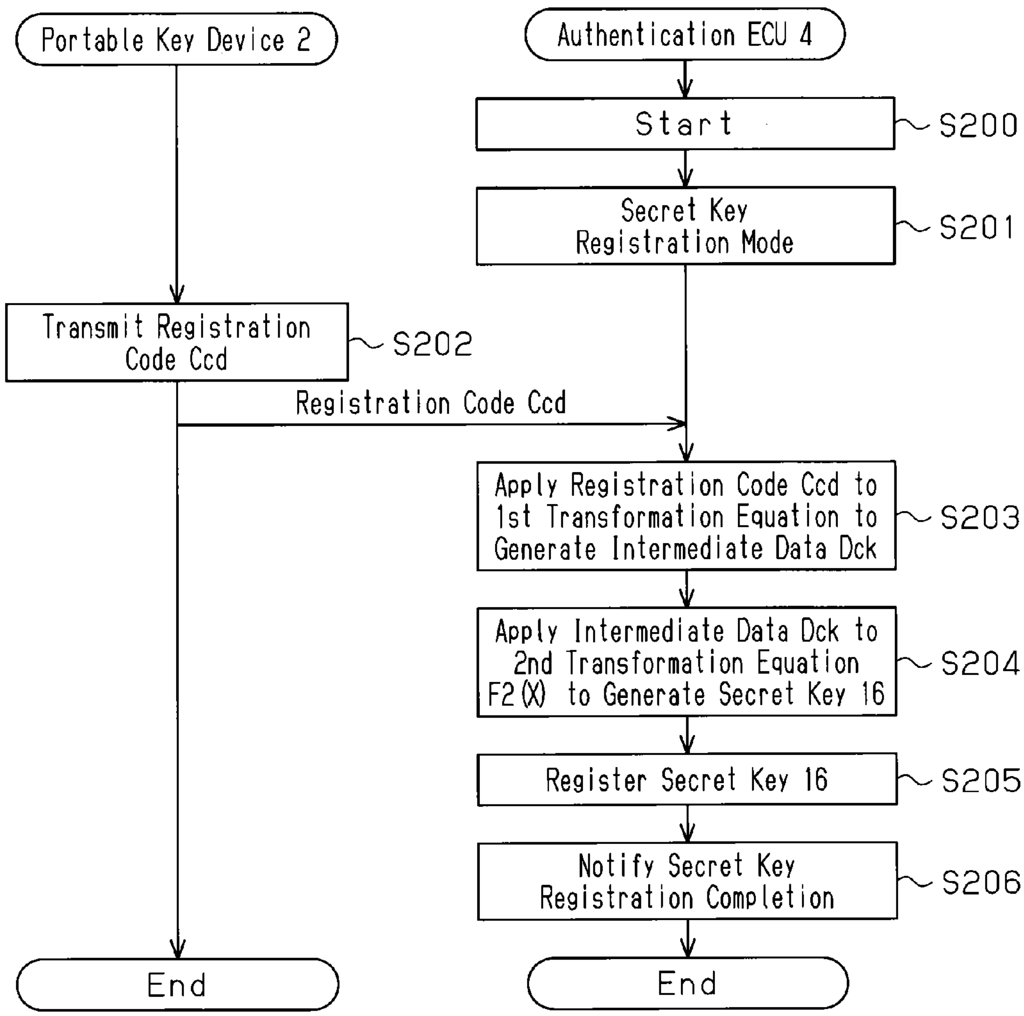
FIG. 5 is a flowchart showing a process for registering the secret key in the vehicle.

FIG. 5 is a flowchart showing a process for registering the secret key 16 in the vehicle 1. Prior to the execution of the process shown in FIG. 5, the first transformation equation F1(x) and the second transformation equation F2(x) are stored in the memory 15 of the authentication ECU 4, and the registration code Ccd is stored in the memory 11 of the portable key device 2. The process of FIG. 5 is executed, for example, before the vehicle 1 is shipped out of the factory. For instance, the process of FIG. 5 may be executed to set a specific portable key device 2 selected from the mass-produced portable key devices as an exclusive key for the vehicle 1. The process of FIG. 5 may be executed using a communication component in the electronic key system 3. In this case, the secret key 16 is registered in the vehicle 1 through wireless communication that complies with the communication protocol of the electronic key system 3.

First, the operator operates an in-vehicle device of the vehicle 1 to request initiation of registration (S200). In response to the request, the vehicle 1 (particularly, the authentication ECU 4) switches to a secret key registration mode (S201).

Then, the lock button 12 and unlock button 13 of the portable key device 2 are operated a predetermined number of times in a predetermined order so that the registration code transfer unit 24 transmits the registration code Ccd, which is registered in the memory 11 of the portable key device 2, to the vehicle 1 with a UHF band signal via the transmitter (S202). The portable key device 2 may be temporarily activated during the period in which step S202 is performed and may return to a standby state after step 5202.

When the vehicle tuner 7 receives the registration code Ccd in the secret key registration mode, the secret key generation unit 25 applies the received registration code Ccd to the first transformation equation F1(x) to generate intermediate data Dck (S203), applies the generated intermediate data Dck to the second transformation equation F2(x) to generate the secret key (S204), and writes the generated secret key 16 to the memory 15 of the authentication ECU 4 (S205). In this manner, the secret key 16 (decryption key) is registered in the memory 15 of the vehicle 1.

Upon confirmation of registration of the secret key 16 to the memory 15, the authentication ECU 4, for example, blinks the hazard light of the vehicle 1 a few times or honks the horn of the vehicle 1 a few times to notify the operator that the secret key registration has been completed (S206). This ends the process of FIG. 5. After registration of the secret key 16 in the portable key device 2 and registration of the secret key 16 in the vehicle 1 are completed, the portable key device 2 and vehicle 1 are shipped out of the factory in a state combined with each other as a set.

In the registration process described above, the writer 17 provides the portable key device 2 with the registration code Ccd when the portable key device 2 is manufactured.

When the secret key 16 is registered in the vehicle 1, the portable key device 2 provides the vehicle 1 with the registration code Ccd through wireless communication. The vehicle 1 generates the secret key 16 with the registration code Ccd received from the portable key device 2 and registers the secret key 16 in the vehicle 1. That is, when the secret key 16 is written to the vehicle 1, the secret key 16 is not directly transmitted to the vehicle 1 through wireless communication. Thus, the secret key 16 cannot be eavesdropped on in the wireless communication performed between the secret key 16 and the portable key device 2.

A third person may wrongfully obtain the first transformation equation F1(x) of the writer 17 and also wrongfully obtain the registration code Ccd transmitted from the portable key device 2 when the secret key 16 is registered in the vehicle 1. However, the second transformation equation F2(x) is not transmitted from the portable key device 2 to the vehicle 1 when the secret key 16 is registered to the vehicle 1. Thus, even if the registration code Ccd and the first transformation equation F1(x) can be obtained, the third person would not be able to obtain the second transformation equation F2(x), which is indispensable for generating the secret key 16. This prevents the third person from obtaining the secret key 16. In this manner, since the third person cannot obtain the secret key 16, the technique for registering the secret key 16 in the preferred embodiment increases the security level of the secret key 16 against theft.

The preferred embodiment has the advantages described below.

(1) The writer 17 and the portable key device 2 cooperate to carry out a task for generating the secret key 16 from the registration code Ccd. The first transformation equation F1(x) and the second transformation equation F2(x) are separately held by the writer 17 and the portable key device 2. This increases the parameters required to generate the secret key 16. These parameters must all be obtained to generate the secret key 16. This makes it difficult to wrongfully obtain the secret key 16 and improves the security of the vehicle 1.

(2) After the secret key 16 is registered in the portable key device 2, the intermediate data Dck is deleted from the memory 11 of the portable key device 2. This makes it difficult to obtain the intermediate data Dck from the portable key device 2, prevents the secret key 16 from being wrongfully obtained, and thereby improves the security of the vehicle 1.

(3) The first transformation equation F1(x) held by the writer 17 and the second transformation equation F2(x) held by the portable key device 2 are set so that the computation load on the writer 17 (calculation amount for generating the intermediate data Dck from the registration code Ccd) is greater than the computation load on the portable key device 2 (calculation amount for generating the secret key 16 from the intermediate data Dck). This allows for reduction in the size of the transformation equation held by the portable key device 2, and the memory 11 of the portable key device 2 does not need a large capacity.

It should be apparent to those skilled in the art that the present invention may be embodied in many other specific forms without departing from the spirit or scope of the invention. Particularly, it should be understood that the present invention may be embodied in the following forms.

The electronic key system 3 is not limited to a wireless door lock system. The electronic key system 3 may be, for example, a key operation-free system in which the portable key device 2 automatically returns an ID code in response to an ID response request from the vehicle 1. The electronic key system 3 may also be a combination of a wireless door lock system and a key operation-free system.

The encryption technique is not particularly limited, and a known encryption technique may be employed, such as DES (Data Encryption Standard), FEAL (Fast data Encipherment ALgorithm), MISTY, and IDEA (International Data Encryption Algorithm).

After the secret key 16 is registered in the portable key device 2, the transformation equation may be deleted from the portable key device 2. Further, after the secret key 16 is registered in the vehicle 1, the transformation equation(s) may be deleted from the vehicle 1.

The writer 17 may provide the portable key device 2 with the registration code Ccd and the intermediate data Dck through wired communication or wireless communication.

After the writer 17 provides the intermediate data Dck to the portable key device 2, the generated intermediate data Dck may be deleted from the writer 17.

The secret key 16 may be registered to the portable key device 2 when the portable key device 2 is manufactured. Otherwise, the secret key 16 may be registered to the portable key device 2 when sold to a user. In this manner, the timing for registering the secret key 16 to the vehicle 1 is not limited.

When registering the secret key to the vehicle 1, the trigger for switching the vehicle 1 to the secret key registration mode is not limited to the predetermined operation of a vehicle device. For example, a tool such as a computer connected to the vehicle 1 may send an instruction to the vehicle 1 to switch the vehicle to the secret key registration mode.

The ratio (weighting) of the calculation amount of the first transformation equation F1(x) and the calculation amount of the second transformation equation F2(x) may be set so that the calculation amount of the second transformation equation F2(x) is greater than the calculation amount of the first transformation equation F1(x). Alternatively, the calculation amount of the first transformation equation F1(x) may be greater than the calculation amount of the second transformation equation F2(x). Otherwise, the calculation amount of the first transformation equation F1(x) may be the same as the calculation amount of the second transformation equation F2(x).

The intermediate data Dck is data that when alone cannot be used as the secret key 16 and may thus be referred to as a temporary secret key or a precursor (incomplete) secret key.

The remote communication terminal is not limited to the portable key device 2 and may be any type of a terminal. The communication peer is not limited to the vehicle 1 and may be any type of device as long as it can perform authentication with the terminal. In other words, the registration system and method according to the present invention is applicable to any system as long as it is a system that performs cryptographic communication between two devices.

The processor in each of the writer 17, the portable key device 2, and the vehicle 1 may be hardware or software. In the illustrated example, each processor is a functional block implemented when a CPU executes a secret key registration program.

The present examples and embodiments are to be considered as illustrative and not restrictive, and the invention is not to be limited to the details given herein, but may be modified within the scope and equivalence of the appended claims.

What is claimed is:

1. A secret key registration system which registers a secret key in each of a remote communication terminal and a communication peer, which performs wireless communication with the remote communication terminal, the secret key registration system comprising:

a remote communication terminal which generates a wireless signal encrypted by the secret key and transmits the encrypted wireless signal through wireless communication;

a communication peer which receives the encrypted wireless signal from the remote communication terminal through the wireless communication and decrypts the encrypted wireless signal with the secret key;

a writer which generates a registration code that is varied whenever registering the registration code and writes the registration code to the remote communication terminal;

a first transformation equation and a second transformation equation for generating the secret key, in which the registration code is transformed with the first transformation equation to generate intermediate data, and the generated intermediate data is transformed with the second transformation equation to generate the secret key, the first transformation equation being stored in each of the writer and the communication peer, and the second transformation equation being stored in each of the remote communication terminal and the communication peer;

wherein the writer is configured to transmit the registration code to the remote communication terminal, apply the registration code to the first transformation equation stored in the writer to generate the intermediate data, and transmit the intermediate data to the remote communication terminal, wherein the remote communication terminal is configured to apply the intermediate data to the second transformation equation stored in the remote communication terminal to generate the secret key, register the generated secret key in the remote communication terminal, and transmit the registration code stored in the remote communication terminal to the communication peer through wireless communication, and wherein the communication peer is configured to apply the registration code received from the remote communication terminal to the first transformation equation stored in the communication peer to generate the intermediate data, apply the generated intermediate data to the second transformation equation stored in the communication peer to generate the secret key, and register the generated secret key in the communication peer, wherein the remote communication terminal, which is separated from the writer, stores the second transformation equation but does not store the first transformation equation, and wherein the writer, which is separated from the remote communication terminal, stores the first transformation equation but does not store the second transformation equation.

2. The secret key registration system according to claim 1, wherein the first registration processor deletes the intermediate data from the remote communication terminal after generating the secret key.

3. The secret key registration system according to claim 1, wherein the first transformation equation involves a larger computation volume than the second transformation equation.

4. The secret key registration system according to claim 1, wherein: the communication peer is a vehicle; and the remote communication terminal is a portable key device for use with the vehicle.

5. The system according to claim 1, wherein the writer, the remote communication terminal and the communication peer are remote from each other.

6. The system according to claim 1, wherein the writer transmits the registration code and the intermediate data to the remote communication terminal only when manufacturing the remote communication terminal.

7. A method for registering a secret key using a system, the system including a remote communication terminal which generates a wireless signal encrypted by the secret key and transmits the encrypted wireless signal through wireless communication, a communication peer which receives the encrypted wireless signal from the remote communication terminal through the wireless communication and decrypts the encrypted wireless signal with the secret key, and a writer which generates a registration code that is varied whenever registering the registration code and writes the registration code to the remote communication terminal, the method comprising:

preparing a first transformation equation and a second transformation equation for generating the secret key, in which the registration code is transformed with the first transformation equation to generate intermediate data, and the generated intermediate data is transformed with the second transformation equation to generate the secret key, storing the first transformation equation in each of the writer and the communication peer, but not storing the first transformation equation in the remote communication terminal, which is separated from the writer, and storing the second transformation equation in each of the remote communication terminal and the communication peer but not storing the second transformation equation in the writer, which is separated from the remote communication terminal;

registering the secret key in the remote communication terminal; and registering the secret key in the communication peer;

wherein the registering the secret key in the remote communication terminal includes transmitting the registration code from the writer to the remote communication terminal, applying the registration code to the first transformation equation stored in the writer to generate the intermediate data, transmitting the intermediate data to the remote communication terminal, applying the intermediate data to the second transformation equation stored in the remote communication terminal to generate the secret key, and registering the generated secret key in the remote communication terminal; and the registering the secret key in the communication peer includes transmitting the registration code stored in the remote communication terminal to the communication peer through wireless communication, applying the registration code received from the remote communication terminal to the first transformation equation stored in the communication peer to generate the intermediate data, applying the generated intermediate data to the second transformation equation stored in the communication peer to generate the secret key, and registering the generated secret key in the communication peer.

8. The method according to claim 7, wherein the registering the secret key in the remote communication terminal is performed prior to the registering the secret key in the communication peer.

9. A secret key registration system which registers a secret key in each of an electronic key device and a vehicle, which performs wireless communication with the electronic key device, the secret key registration system comprising:

a remote electronic key device which generates a wireless signal encrypted by the secret key and transmits the encrypted wireless signal through wireless communication;

a vehicle which receives the encrypted wireless signal from the remote electronic key device through the wireless communication and decrypts the encrypted wireless signal with the secret key;

a writer which generates a registration code that is varied whenever registering the registration code and transmits the registration code to the remote electronic key device;

a first transformation equation and a second transformation equation for cooperating to generate the secret key, wherein the registration code is transformed with the first transformation equation to generate intermediate data, and the generated intermediate data is transformed with the second transformation equation to generate the secret key;

a writer memory which is arranged in the writer and stores the first transformation equation and does not store the second transformation equation;

an intermediate data generation unit arranged in the writer to generate an intermediate data based on the registration code and the first transformation equation stored in the writer memory;

an electronic key device memory which is arranged in the electronic key device and stores the second transformation equation and does not store the first transformation equation;

an electronic key device secret key generation unit which is arranged in the electronic key device and configured to receive the registration code and the intermediate data transmitted from the writer, generate the secret key based on the received intermediate data and the second transformation equation stored in the electronic key device memory, and register the generated secret key in the electronic key device;

a registration code transfer unit which is arranged in the electronic key device and transmits to the vehicle the registration code generated by and received from the writer;

a vehicle memory which is arranged in the vehicle and stores the first and second transformation equations; and a vehicle secret key generation unit which is arranged in the vehicle and configured to receive the registration code from the electronic key device, generate the secret key based on the received registration code, the first and second transformation equations stored in the vehicle memory, and register the generated secret key in the vehicle.

10. The system according to claim 9, wherein the writer, the remote electronic key device and the vehicle are remote from each other.

11. The system according to claim 9, wherein the writer transmits the registration code and the intermediate data to the electronic key device only when manufacturing the remote electronic key device.

* * * * *